Patented July 9, 1946

2,403,459

UNITED STATES PATENT OFFICE 2,403,459

CHEMICAL PROCESS

Carl L. Rollinson, Dayton, Ohio, assignor to E. I. du Pont de Nemours & Company, Wilmington, Del., a corporation of Delaware No Drawing. Application November 29, 1943, Serial No. 512,257

7 Claims. (Cl. 23—174)

This invention relates to the stabilizing of sulfur trioxide and to the lowering of its freezing point and is more particularly directed to stable sulfur trioxide compositions which contain small amounts of thionyl chloride.

It has not in the past been found practical to employ liquid sulfur trioxide for many uses because of the difficulty of storing and handling this material. Liquid sulfur trioxide readily freezes and it also changes rather rapidly to solid modifications. Even after sulfur trioxide is carefully dried to remove any traces of moisture it is stable for only a few days even if it is kept warm enough, say about 25° C., that it will not freeze because it changes to a solid modification. If permitted to freeze, then it rapidly polymerizes to the beta-modification.

The beta-modification of sulfur trioxide is difficult to convert to a usable condition because of its very poor heat conductivity. It must be heated to rather high temperatures, say from about 40 or 50° C. up to about 90° C., to effect conversion back to the alpha form. This so-called "beta"-modification apparently has no fixed melting point and it is probably a mixture of polymers which melt over a wide range and some as high as 90° C.

A crystalline gamma modification also forms if sulfur trioxide is stored for any length of time and this, like the beta-form, is difficult to convert back to the alpha-modification. An additional difficulty is encountered with this modification since it sublimes without melting at atmospheric pressure. The readiness with which sulfur trioxide freezes and the readiness with which it polymerizes has prevented its use in many relations, such as a reagent in inorganic chemical reactions, where it might otherwise find wide employment.

It is an object of the present invention to stabilize liquid sulfur trioxide. It is a further object to provide liquid sulphur trioxide compositions which are not only stable at fairly low temperatures but which do not freeze as readily as liquid sulfur trioxide itself. Further objects will become apparent hereinafter.

The foregoing and other objects of this invention are attained by the addition to liquid sulfur trioxide of minor amounts of thionyl chloride. Even in very small amounts thionyl chloride serves to stabilize sulfur trioxide against polymerization to the beta or gamma modification. In somewhat larger amounts a marked lowering of freezing point is also secured.

Liquid sulfur trioxide to be stabilized according to the present invention should be substantially free from moisture and it will be found necessary in some cases to dehydrate the sulfur trioxide over a suitable dehydrating agent such as phosphorus pentoxide. Not only should the sulfur trioxide be free from water initially but even after it is stabilized with thionyl chloride great care should be exercised to exclude moisture. Even a small amount of water seems to act as a catalyst for the polymerization to the beta and gamma modifications. The effectiveness of thionyl chloride as an agent for lowering freezing point is of course not quite so dependent upon the exclusion of moisture but even for this latter use the exclusion of moisture is highly desirable.

A dehydrating agent may be included in sulfur trioxide containing thionyl chloride as a stabilizing agent. There may be used a dehydrating agent capable of taking up water in the presence of sulfur trioxide and there may be employed, for instance, phosphorus pentoxide ($P_2O_5$).

The amount of thionyl chloride to be included in liquid sulphur trioxide according to the present invention may be widely varied though generally it will be found desirable to use at least about 0.2 percent of $SOCl_2$ by weight. This small amount of thionyl chloride and even smaller amounts have some effect upon the stability of liquid sulfur trioxide through for a commercially valuable result it will probably be found desirable to use about 2 percent of thionyl chloride.

If the thionyl chloride is not objectionable in the use for which the sulfur trioxide is to be employed then very large amounts may be used though ordinarily a minor amount would be preferable since no useful purpose would be served by the inclusion of very large quantities of thionyl chloride. While smaller amounts lower the freezing point of liquid sulfur trioxide about 5 percent of thionyl chloride lowers the freezing point to 0° C. While about 7 percent of thionyl chloride lowers the freezing point to below 0° C. these larger amounts will accordingly be found useful when it is desired to lower the freezing point and for stabilizing and lowering the freezing point of sulfur trioxide it will generally be preferred to use from about 2 to 15 percent of thionyl chloride by weight.

Example I

Liquid sulfur trioxide was dried over phosphorus pentoxide and was run into a glass tube in which there had been weighed equivalent of 1.7 percent by weight of dry thionyl chloride. For purposes of observation the glass tube was sealed off so that moisture could not find its way into the sulfur trioxide.

The sulfur trioxide stabilized with thionyl chloride was frozen to produce transparent ice-like crystals of the alpha modification which melted readily. The sulfur trioxide was frozen and remelted 135 times. After 31 days the sulfur trioxide was still a clear liquid with a very small amount of solid observable. Even after 76 days there were only a few gamma needles in the vapor space.

A similar sample of stabilized sulfur trioxide was prepared using 0.27 percent of thionyl chloride and this, like the one above, was repeatedly frozen and remelted. After 85 remeltings the product has become about ⅔ solid. This demonstrates the remarkable ability of even small amounts of thionyl chloride to effect some stabilization since without thionyl chloride the sulfur trioxide would have solidified almost immediately rather than being even partly in the alpha modification at the end of 18 days.

A similar sample was prepared using 5.30 percent by weight of thionyl chloride and after 140 remeltings the sulfur trioxide was still a clear liquid.

*Example II*

Stabilized sulfur trioxide of markedly lowered freezing point was prepared following the procedures of Example I and using somewhat larger amounts of thionyl chloride. One sample was prepared using 7.21 percent of thionyl chloride by weight and this did not freeze at 0° C. After 76 days the sulfur trioxide was still a clear liquid.

Similar results and even greater lowering of freezing point was obtained using about 14 percent of thionyl chloride and using about 21 percent of thionyl chloride. The latter sample did not freeze even at minus 10° C.

While there are shown certain illustrative processes and compositions it will be understood without departing from the spirit of this invention one may readily employ thionyl chloride for the stabilization and lowering of the freezing point of liquid sulfur trioxide in numerous ways.

I claim:

1. Liquid sulfur trioxide containing a minor amount of thionyl chloride.

2. Liquid sulfur trioxide containing at least 0.2 percent of thionyl chloride.

3. Liquid sulfur trioxide containing at least 2 percent of thionyl chloride.

4. Liquid sulfur trioxide containing from about 2 to 15 percent of thionyl chloride.

5. Liquid sulfur trioxide containing about 2 percent of thionyl chloride and being essentially free from water.

6. Liquid sulfur trioxide containing minor amounts of thionyl chloride and a dehydrating agent.

7. In a process for stabilizing sulfur trioxide, the step comprising adding thionyl chloride in an amount sufficient to stabilize the sulfur trioxide.

CARL L. ROLLINSON.